Figure 2:
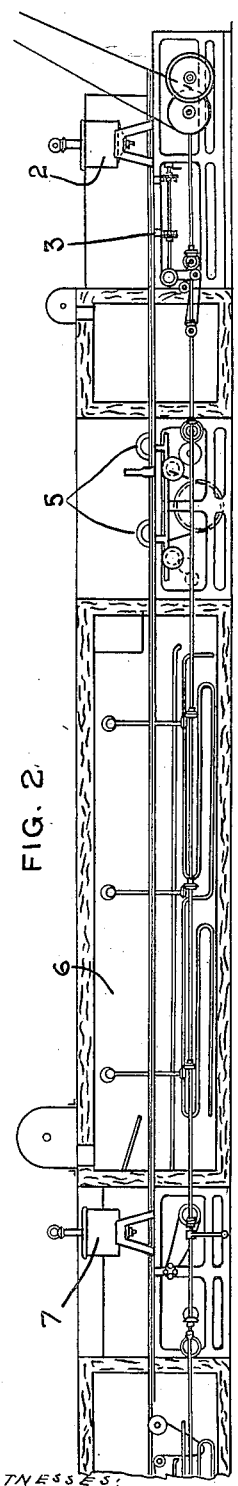

W. BOYD.
PROCESS FOR DEPOSITING INTO CHOCOLATE CONFECTIONERY, CENTERS OF FRUIT PRODUCTS OR OTHER FOOD STUFFS.
APPLICATION FILED JULY 3, 1914.

1,138,929.

Patented May 11, 1915.

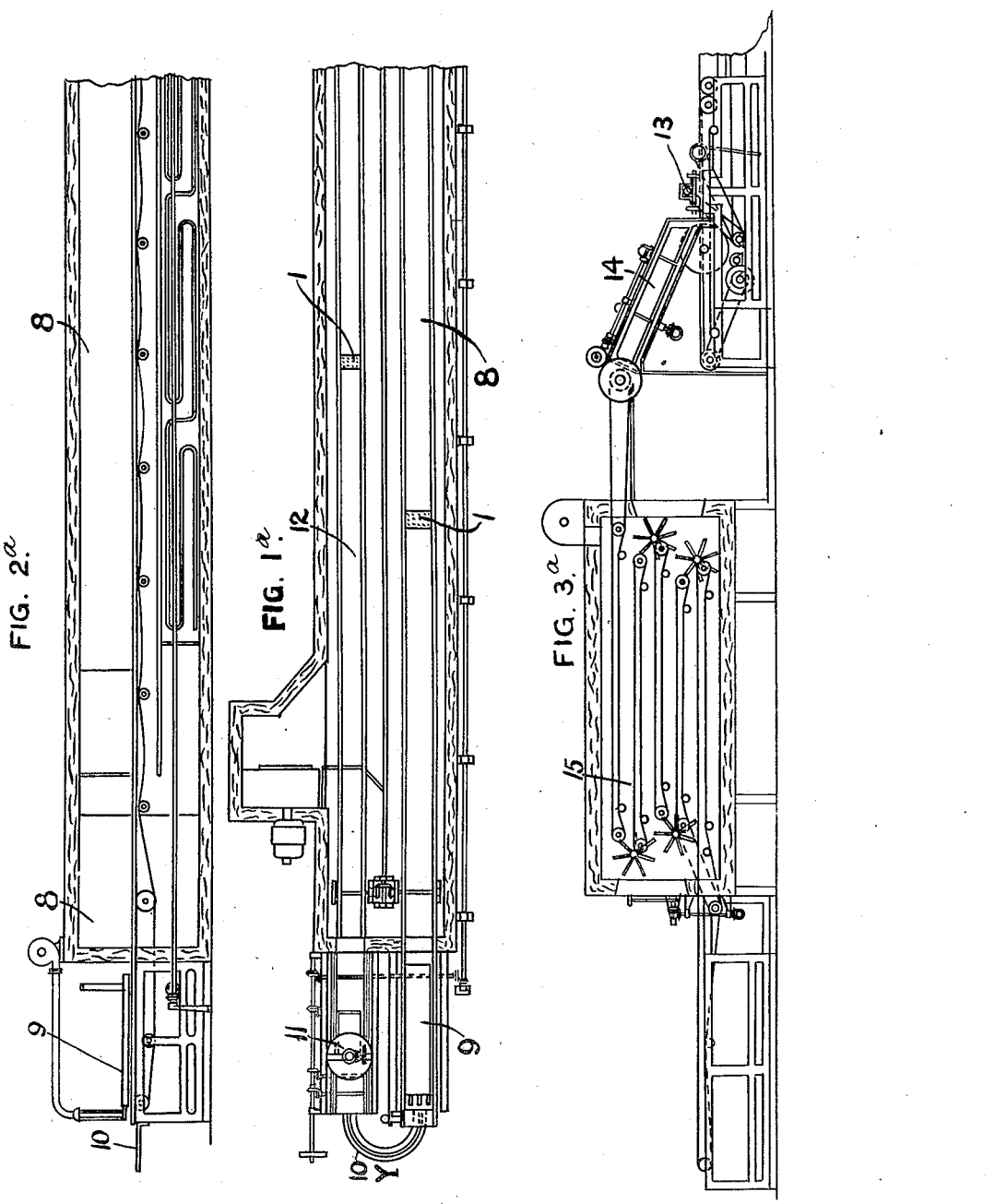

UNITED STATES PATENT OFFICE.

WILLIAM BOYD, OF DUNDEE, SCOTLAND.

PROCESS FOR DEPOSITING INTO CHOCOLATE CONFECTIONERY CENTERS OF FRUIT PRODUCTS OR OTHER FOOD STUFFS.

1,138,929.   Specification of Letters Patent.   Patented May 11, 1915.

Application filed July 3, 1914. Serial No. 848,853.

*To all whom it may concern:*

Be it known that I, WILLIAM BOYD, a subject of the King of Great Britain and Ireland, residing at Claremont, West Ferry, Dundee, in the county of Forfar, Scotland, have invented new and useful Improvements in New and Improved Processes for Depositing into Chocolate Confectionery Centers of Fruit Products or other Food Stuffs, of which the following is a specification.

This invention relates to a new and improved process for molding chocolate with cream or other centers.

There are various processes for making chocolate confectionery. The usual process consists in coating or covering with liquid chocolate solidified centers which have been previously cast in starch, rubber or composition molds or other suitable molding material. In my invention I pour or deposit hot centers in a liquid or plastic condition into chilled chocolate made in the form of shells, containers, or cups which finally form part of the sweetmeat, thus obviating the necessity of employing any other molding material. Certain kinds have been made by hand in which cold liquid centers have been deposited into chocolate shells, the exposed portion of such centers being subsequently covered with liquid chocolate.

The essential features of the invention in the manufacture of chocolate coated confectionery according to my process are as follows: Chilled centers or containers of chocolate in the form of cups are first formed, in suitable molds, the hot centers in a liquid or plastic condition are then poured or deposited into such shells, the low temperature of the shells being maintained or further reduced and consequently lowering the temperature of the centers deposited therein sufficiently to prevent the shell melting with the heat of the centers thereafter heating the edges of the chocolate shells and the exposed surfaces of the centers to such a temperature as will enable the edges of the shell to combine with liquid chocolate which is finally deposited thereon, thereby completely covering each center, after which the temperature is reduced sufficiently to set the completed shell and enable it to be removed from the mold.

From the foregoing it will be understood that the chief novelty of my process consists in the depositing of hot centers into chilled chocolate shells which because of their temperature are not detrimentally affected by contact with the hot centers. By the term "hot" I mean a temperature which is in excess of the melting point of chocolate.

In order that my said invention and the manner of putting the same into practice may be properly understood, I have hereunto appended two explanatory sheets of drawings in which the same reference numerals are used to indicate corresponding parts in the figures shown.

It is to be understood that the drawings illustrate only one type of machine for carrying out my process and that the details may be modified in any way which will effectually carry out such process.

Figure 1:
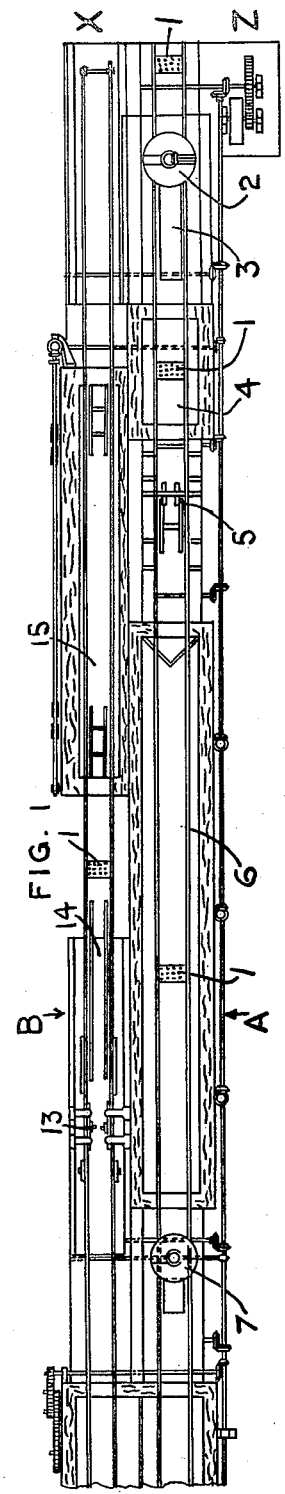
Figure 3:
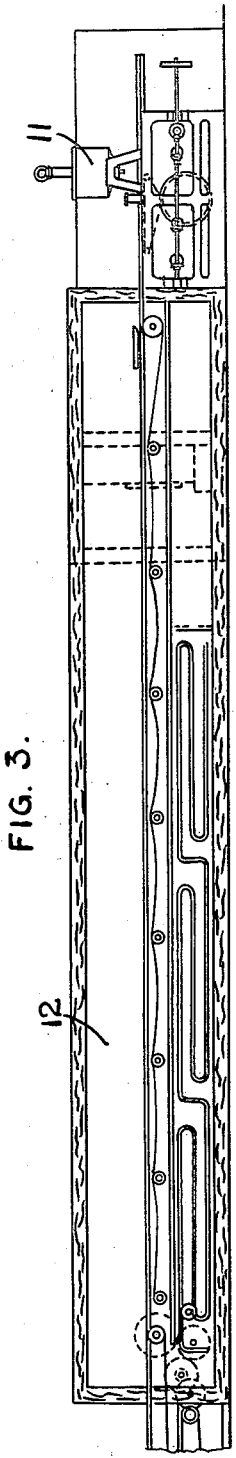

Figures 1 and 1ª (Sheets 1 and 2) combined show a general plan of the machine. Figs. 2 and 2ª (Sheets 1 and 2) combined show a view looking in the direction of the arrow A (Fig. 1). Figs. 3 and 3ª (Sheets 1 and 2) combined show a view looking in the direction of the arrow B (Fig. 1).

The process, which is continuous, may be divided into five steps:—

The first step consists in filling a metal or other suitable container or mold with liquid chocolate, chilling the mold and its contents sufficiently to cause a film of chocolate of the desired thickness to form on the sides of the mold and then removing the remaining liquid portion of such chocolate. In the machine used to illustrate the process several hundred molds 1 are used which continuously travel, one immediately behind the other, from the initial point of departure at Z or commencement of the process along the machine to the turning or transferring point at Y and back again to X where there may be a turning or transferring device similar to that at Y thus placing the molds one after the other in their initial position. Each mold in turn moves along the machine intermittently or continuously to suit the exigencies of the situation. When moving from the starting point Z the metal molds move intermittently beneath the chocolate depositor 2 and are filled with liquid chocolate. They then pass over a vibratory table 3 its purpose being to settle the liquid chocolate equally in the molds and expel any air which may be in the liquid. After that the molds pass through a refrigerating chamber 4 where they are chilled and the film of chocolate formed on the sides of the mold leaving a liquid center of chocolate.

The molds each in turn then pass to the emptying device 5 where they are first quickly turned upside down to allow the remaining liquid to drop out, the faces of the molds scraped and cleaned and again turned to their original position. Each mold now contains shells of chocolate.

The second step consists in further reducing the temperature of the mold and the shell of chocolate, formed as above described, low enough to prevent the shell of chocolate being melted by the hot center which is now deposited in it. The cooling of the mold and shells is effected in their passage through the cold chamber 6 and each mold on emerging from the cold chamber passes intermittently and in turn beneath the hot center depositor 7. The temperature of the cold chamber is so adjusted that the chocolate shell is at a sufficiently low temperature to more than balance the melting action of the hot center.

The third step consists in the reduction of the temperature of the center to the same degree of cold as the shell of chocolate. After passing the depositor 7 each mold moves in turn into the cold chamber 8 remaining long enough therein in its passage for the temperature of the center to fall to the temperature of its mold.

The fourth step consists in warming the top of the shell of chocolate to such a temperature that it can combine with liquid chocolate. Incidentally the exposed surface of the center should and will also be heated. On emerging from the cold chamber 8 each mold passes under a hot plate 9 where the exposed upper surfaces of the chocolate shells and centers are heated to the desired temperature. Each mold then passes from under the hot plate to the return table 10 being quickly passed to the chocolate depositor 11.

The fifth step consists in completing the covering of the centers by depositing liquid chocolate on them, afterward reducing the temperature of the goods until the chocolate sets and finally removing the goods from the mold. When each mold intermittently passes under the chocolate depositor 11 the exposed edges of each shell and center are covered with liquid chocolate and in their passage to the cooling chamber 12 the surplus chocolate is scraped off the mold. On emerging from the cooling chamber 12 the molds with the finished goods pass to an emptying machine 13 where they are rapped out of the molds, the empty molds passing up the gangway 14 and into the reheating chamber 15 where in their passage they attain a temperature suitable for the chocolate which is first deposited. On emerging from the re-heating chamber 15 the molds pass along to the feed end of the machine to again repeat the process described.

From the foregoing it will be understood that the goods from start to finish need not be touched by hand.

I wish it to be understood that my invention is not limited to the details of the above process, as the latter may be varied in many respects so long as efficient cooling is applied at the proper time to enable the centers to be deposited into the chocolate.

I claim:—

1. In the manufacture of chocolate confectionery having centers of fruit products or other food stuffs which are liquefied by artificial heat and which set, jell or solidify on cooling; a process consisting in forming in molds chilled chocolate shells which form the containers or cups of the produced sweetmeat; then cooling said shells, then filling said shells with compatively hot centers; then cooling said shells and centers; then warming the exposed surfaces of said shells and centers; then depositing liquid chocolate upon the exposed surfaces of said shells and centers; and then finally cooling the whole product.

2. In the manufacture of confectionery having centers of fruit products, or other food stuffs which are liquefied by artificial heat and which set, jell or solidify on cooling; the process of forming shells by pouring liquid which forms the coating of the confection into molds, the molds being cooled sufficiently to solidify the liquid immediately in contact therewith; then pouring out or removing the liquid centers from the shell and then cooling the shell thereby made; then pouring or depositing into said shell the hot center in a liquid or plastic condition the cooling of the mold being sufficient to preserve the shell, and then finally cooling the product.

3. In the manufacture of confectionery having centers of fruit products or other food stuffs which are liquefied by artificial heat and which set, jell or solidify on cooling; the process of filling molds with liquid which forms the coating of the confection; then chilling the mold and its contents sufficiently to cause the liquid to form a hard film of a desired thickness on the sides of the mold, and then removing the remaining liquid portions from said film or shell; then pouring or depositing into the shell a hot center in a liquid or plastic condition, the chilling of the mold being sufficient to preserve the shell; then chilling the shell and center; then warming the exposed surfaces of the shell and the center sufficiently to combine with other liquid, and then coating the exposed edges of the shell and the exposed surfaces of the center with such liquid, and then cooling the goods sufficiently to enable them to be rapped out of the said molds, substantially as described.

4. In the manufacture of confectionery having centers of fruit products or other food stuffs which are liquefied by artificial heat and which set, jell or solidify on cooling; the process of filling molds with liquid which forms the coating of the confection, then chilling the mold and its contents sufficiently to cause the liquid to form a hard film of a desired thickness on the sides of the mold, and then removing the remaining liquid portions from said film or shell; then pouring or depositing into the shell a hot center in a liquid or plastic condition, the filling of the mold being sufficient to preserve the shell, then chilling the shell and center, then warming the exposed surfaces of the shell and center sufficiently to enable it to be combined with liquid chocolate and then coating the exposed edges of the shell and the exposed surfaces of the center with liquid chocolate and then finally cooling the goods sufficiently to enable them to be rapped out of said molds, substantially as described.

5. In the manufacture of chocolate confectionery having centers of fruit products or other food stuffs which are liquefied by artificial heat and which set, jell or solidify on cooling; the process consisting in forming in molds chilled chocolate shells which form the containers or cups of the produced sweetmeats; then cooling said shells, then filling said shells with comparatively hot centers, then cooling said shells and centers and then finally closing the shells.

In testimony whereof I have signed my name to this specification in the presence of two subscribing witnesses.

WILLIAM BOYD.

Witnesses:
GEORGE CAMERON DOUGLAS,
WILLIAM SCOTT.